(12) United States Patent
Iwafune

(10) Patent No.: US 11,320,071 B2
(45) Date of Patent: May 3, 2022

(54) CLAMP

(71) Applicant: TOGO SEISAKUSYO CORPORATION, Aichi (JP)

(72) Inventor: Takahiro Iwafune, Aichi (JP)

(73) Assignee: TOGO SEISAKUSYO CORPORATION, Aichi-Ken (JP)

( * ) Notice: Subject to any disclaimer, the term of this patent is extended or adjusted under 35 U.S.C. 154(b) by 172 days.

(21) Appl. No.: 16/626,846

(22) PCT Filed: May 25, 2018

(86) PCT No.: PCT/JP2018/020179
§ 371 (c)(1),
(2) Date: Dec. 26, 2019

(87) PCT Pub. No.: WO2019/035257
PCT Pub. Date: Feb. 21, 2019

(65) Prior Publication Data
US 2020/0224805 A1    Jul. 16, 2020

(30) Foreign Application Priority Data

Aug. 17, 2017 (JP) .............................. JP2017-157528

(51) Int. Cl.
*F16L 21/06* (2006.01)

(52) U.S. Cl.
CPC .................... *F16L 21/06* (2013.01)

(58) Field of Classification Search
CPC . F16L 25/06; F16L 21/06; F16L 33/00; F16L 33/02; F16L 33/021; F16L 33/20; F16L 33/207; F16L 33/2071; B65D 63/02; F16B 2/245

USPC .......................................... 285/242, 252, 420
See application file for complete search history.

(56) References Cited

U.S. PATENT DOCUMENTS

| 5,405,170 A * | 4/1995 | Roulinson ............... F16L 33/02 24/20 R |
| 5,414,905 A | 5/1995 | Kimura et al. |
| 2002/0073513 A1* | 6/2002 | Tanaka .................. B65D 63/02 24/20 R |
| 2009/0049656 A1 | 2/2009 | Morita |
| 2014/0045377 A1 | 2/2014 | Okamoto et al. |

FOREIGN PATENT DOCUMENTS

| CN | 1357703 A | 7/2002 |
| JP | S46-32671 Y1 | 11/1971 |
| JP | S57-119189 U | 7/1982 |

(Continued)

*Primary Examiner* — Aaron M Dunwoody
(74) *Attorney, Agent, or Firm* — Christensen, Fonder, Dardi & Herbert PLLC

(57) ABSTRACT

A clamp serves to fasten a shield member to a tubular portion of a shield shell using the elastic restoring force of the clamp. The clamp includes an annular clamp body and a pair of tabs. The tubular portion includes a tubular outer contour having two straight sections and two curved sections in a cross-sectional view. The clamp body includes a straight corresponding section corresponding to one of the straight section of the tubular portion and curved corresponding sections corresponding to the curved sections. The straight corresponding section is configured to bend less easily than the curved corresponding sections.

15 Claims, 8 Drawing Sheets

(56) References Cited

FOREIGN PATENT DOCUMENTS

| | | |
|---|---|---|
| JP | S60-161778 U | 10/1985 |
| JP | H05-82251 U | 11/1993 |
| JP | H05-83580 U | 11/1993 |
| JP | H10-318473 A | 12/1998 |
| JP | 2002-181269 A | 6/2002 |
| JP | 2012-252874 A | 12/2012 |
| WO | WO 2007/108155 A1 | 9/2007 |

\* cited by examiner

CLAMP

CROSS-REFERENCE TO RELATED APPLICATIONS

The present application is a U.S. National Phase entry of, and claims priority to, PCT Application No. PCT/JP2018/020179, filed May 25, 2018, which claims priority to Japanese Patent Application No. 2017-157528, filed Aug. 17, 2017, both of which are incorporated herein by reference in their entireties for all purposes.

BACKGROUND

The present disclosure relates to a clamp. More particularly, it relates to a clamp which fastens a tubular connecting member to a counter member using the elastic restoring force of the clamp itself. For example, the clamp includes an annular clamp body with opposite ends intersecting each other, and a pair of tabs projecting radially outward from the opposite ends of the clamp body.

A counter member generally has, for example, an elongated cylindrical outer contour having a rectangular shape with rounded corners. The elongated cylindrical outer contour comprises two straight sections and two curved sections, as seen in a direction orthogonal to an axial direction. A conventional clamp according to Japanese Laid-Open Patent Publication No. 2012-252874 fastens a tubular connecting member to a counter member by swaging a ring member. Therefore, the work of attaching the clamp to the counter member is troublesome. It is also troublesome to clamp the members together even if the clamp has a wire clamp or a worm thread clamp, instead of using the ring member.

A conventional clamp according to Japanese Laid-Open Utility Model Publication No. S60-161778 fastens a hose, which covers a counter member having a rectangular tubular outer contour with rounded corned, to the counter member by using the elastic restoring force of the clamp itself. This clamp includes an annular clamp body, with opposite ends intersecting each other, and a pair of tabs outwardly protruding in a radial direction from the opposite ends of the clamp body. The clamp body includes curved corresponding sections corresponding to the curved sections of the counter member and straight corresponding sections corresponding to the straight sections of the counter member. The straight corresponding sections are configured to be more easily bent than the curved corresponding sections.

Therefore, when enlarging the diameter of the clamp body by pinching the pair of tabs, the straight corresponding sections are easily bent, and may even plastically deform. As a result of the deformation, the contacting force of the straight corresponding sections to the hose may be diminished. Since the straight corresponding sections are more easily bent than the curved corresponding sections clamp body, the straight corresponding sections bend more than the curved corresponding sections when the diameter of the clamp body is enlarged. Accordingly, it is difficult to enlarge the size of the curved corresponding sections in a diameter enlarging direction when pinching the clamp. As a result, the clamp body may not be sufficiently widened relative to the shape of the counter member, thereby making it difficult to attach the clamp to the hose.

Therefore, there has conventionally been a need for a clamp that can easily attach a hose. For example, there has been a need for a clamp that can easily attach tubular connecting member, while still allowing the straight corresponding sections of a clamp body to come into close contact with the tubular connecting member.

BRIEF SUMMARY

According to one aspect of the present disclosure, a clamp serves to fasten a tubular connecting member covered to a counter member by the elastic restoring force of the clamp itself. The clamp includes an annular clamp body with opposite ends intersecting, and a pair of tabs projecting radially outward from the opposite ends of the clamp body. The counter member has a tubular outer contour including at least one straight section and at least one curved section in a cross-sectional view orthogonal to an axial direction. The clamp body includes a straight corresponding section corresponding to the straight section and a curved corresponding section corresponding to the curved section of the counter member. At least one straight corresponding section is formed so as to bend less easily than at least one curved corresponding section.

Therefore, the clamp may fasten the tubular connecting member to the counter member by the elastic restoring force of the clamp itself, for example, the elastic restoring force of the clamp body. Consequently, the troublesome conventionally required work, such as swaging of a ring member, tightening of a wire, screwing of a worm, etc., can be eliminated. As a result, the tubular connecting member can be easily fastened to the counter member by the clamp.

At least one straight corresponding section is configured to be less likely to bend than at least one curved corresponding section. Thus, it is possible to prevent at least one straight corresponding section from being bent or plastically deformed when the diameter of the clamp body is enlarged by pinching the pair of tabs. As a result, close-contact between the straight corresponding section of the clamp body and the tubular connecting member can be improved. In addition, close-contact between the tubular connecting member and the straight section of the counter member can be improved.

At least one straight corresponding section is formed so as to bend less easily than at least one curved corresponding section. Therefore, at least one curved corresponding section is more positively bent than at least one straight corresponding section when the diameter of the clamp body is enlarged. As a result, the size of at least one curved corresponding section can be enlarged in the diameter enlarging direction. Accordingly, the clamp body can be easily deformed to have a shape corresponding to the tubular connecting member and the clamp body can be easily attached to the tubular connecting member.

According to another aspect of the present disclosure, one straight corresponding section and the pair of tabs are disposed at opposing positions to each other in a radial direction. Thus, the clamp may be elastically deformed by pinching the pair of tabs, with one straight corresponding section serving as a base.

According to another aspect of the present disclosure, each base end of the pair of tabs is formed to project radially inward of the clamp body, when the clamp is in a free state. Therefore, when the clamp fastens the tubular connecting member to the counter member, each base end of the pair of tabs can elastically push the tubular connecting member toward the counter member.

According to another aspect of the present disclosure, one curved corresponding section and the pair of tabs are disposed at opposing positions to each other in the radial direction. Thus, the clamp may be elastically deformed by pinching the pair of tabs, with one curved corresponding section serving as a base.

DETAILED DESCRIPTION

Figure 1:
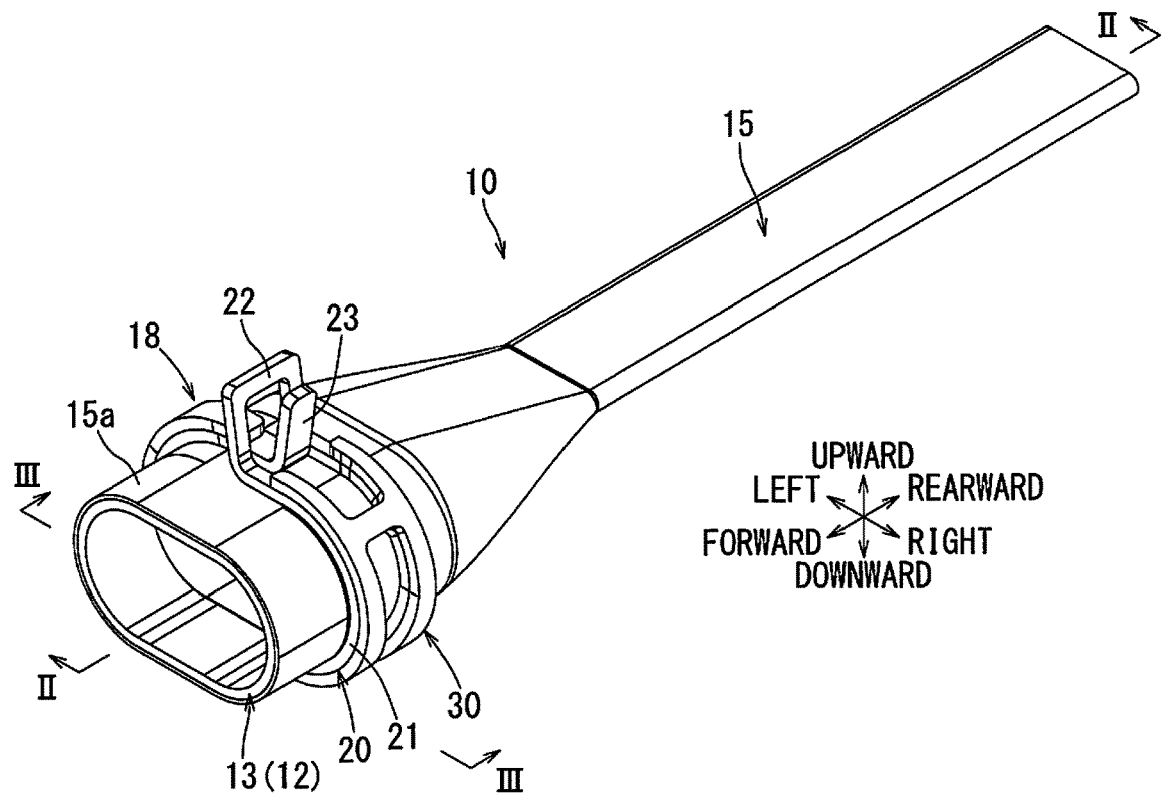
FIG. 1 is a perspective view of a tubular connecting member covering a counter member and a clamp attached to the tubular connecting member, according to a first embodiment.
Figure 2:
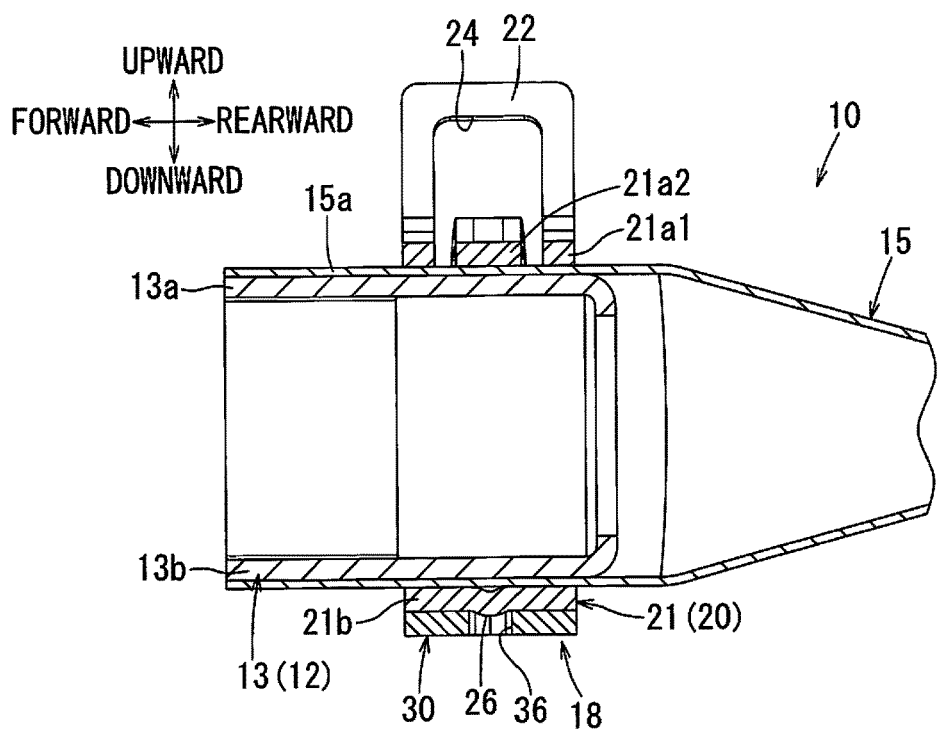
FIG. 2 is a cross-sectional view taken along a line II-II of FIG. 1.
Figure 3:
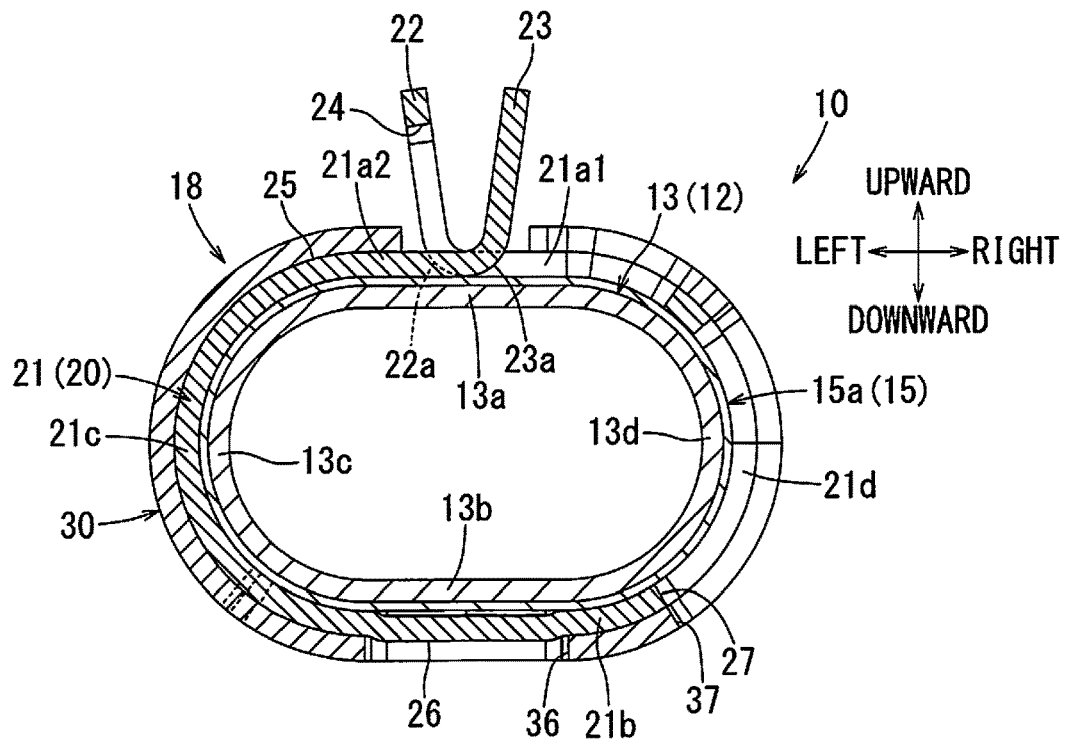
FIG. 3 is a cross-sectional view taken along a line of FIG. 1.

As shown in FIGS. 1 to 3, a clamp according to a first embodiment may be used as part of a shield connector or the like. Although directions concerning the clamp are indicated by arrows in each of the drawings for the convenience of explanation, these directions are not intended to necessitate an orientation direction of the clamp.

As shown in FIG. 1, the shield connector 10 includes a shield shell 12, a shield member 15, and a clamp 18. The shield shell 12 is made of metal and has a tubular portion 13. The tubular portion 13 has an elongated cylindrical shape. The shield connector 10 may be used to cover a connector portion (not shown) of a high-voltage wire harness.

As shown in FIG. 3, the tubular portion (which is an embodiment of a counter member) 13 of the shield shell 12 has a rectangular shape with rounded corners. The tubular portion is comprised of two straight shape sections (which are embodiments of straight sections) 13a, 13b and two curved shape sections (which are embodiments of curved sections) 13c, 13d in a cross-sectional view orthogonal to an axial direction. The two straight shape section 13a, 13b have substantially a straight line shape, for example, parallel lines of the same length. The two curved shape section 13c, 13d have substantially a circular-arc shape, for example, semicircular curved lines having the same radius. In the present embodiment, a longer diameter direction of the tubular portion 13 is oriented in a left-to-right direction. For the sake of explanation, one straight shape section 13a is referred to as a "first straight shape section 13a" and the other straight shape section 13b is referred to as a "second straight shape section 13b." Further, one curved shape section 13c is referred to as a "first curved shape section 13c" and the other curved shape section 13d is referred to as a "second curved shape section 13d."

As shown in FIGS. 1 and 2, the shield member (which is an embodiment of a tubular connecting member) 15 is formed of a longitudinal cylindrical braided wires in which fine metal wires are braided in a mesh pattern. The shield member 15 is flexible and stretchable. As shown in FIG. 2, one end (e.g., the front end) 15a of the shield member 15 is fitted to or covers the tubular portion 13 of the shield shell 12, substantially without a gap by utilizing its flexibility and stretchability (see FIG. 3).

As shown in FIG. 1, one end 15a of the shield member 15 covers the tubular portion 13 of the shield shell 12. A clamp 18 fastens the shield member 15 to the tubular portion 13 from outside using its own elastic restoring force in the diameter reducing direction.

Figure 4:
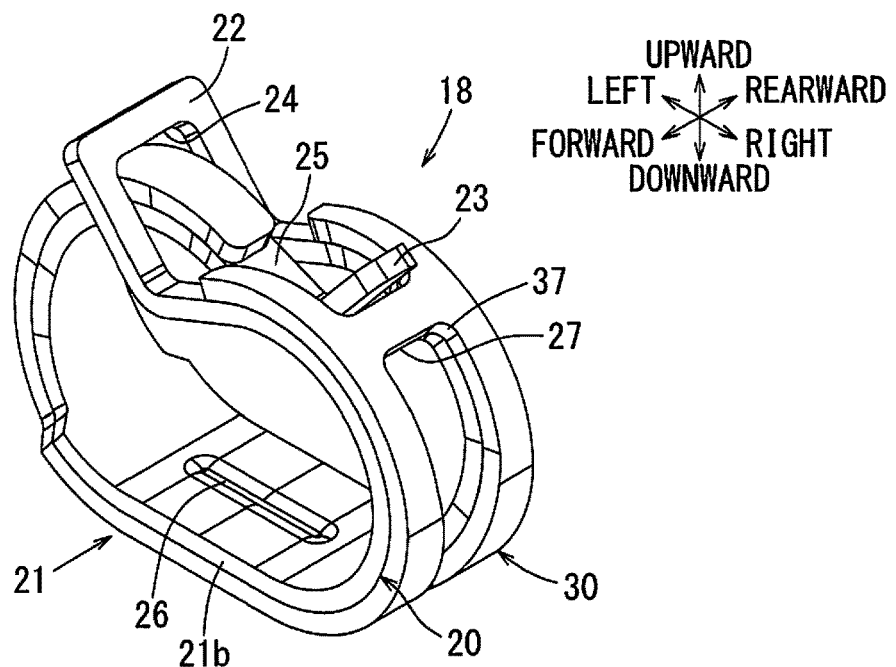
FIG. 4 is a perspective view of the clamp in a free state.

As shown in FIG. 4, the clamp 18 comprises a clamp member 20 constituting its main body and a back-up member 30 configured to enhance the fastening force of the clamp member 20. The clamp member 20 is formed of a leaf spring made of a metal strip. The clamp member 20 includes a clamp body 21 in substantially a C-shape and a pair of tabs 22, 23. The opposite ends of the C-shaped clamp body 21 intersect each other. The tabs 22, 23 project radially outward from each of the ends of the clamp body 21.

Figure 6:
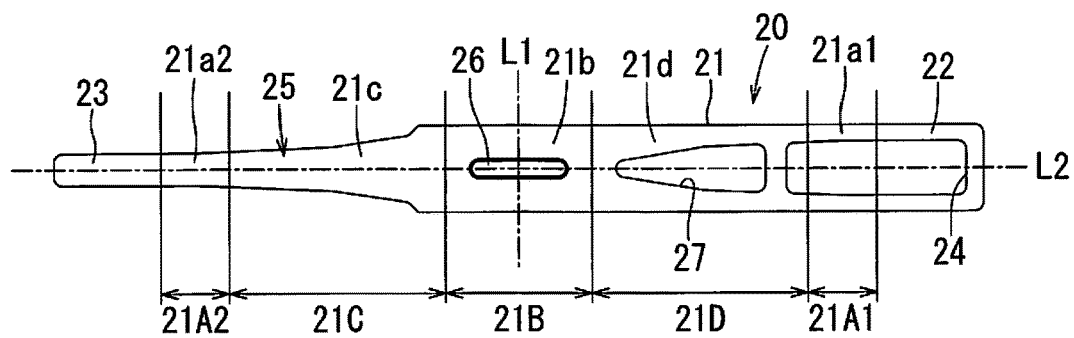
FIG. 6 is a flattened view of a clamp member (e.g., an inner clamp member).

As shown in FIG. 6, the flattened clamp member 20 has generally a plate shape. The tabs 22, 23 are located on opposite ends of the clamp body 21. The clamp member 20 includes a first opening hole 24 having an elongated rectangular shape and a narrow-width section 25 having a single leg shape. The first opening hole 24 extends from one end of the clamp body 21 and continues into the corresponding tab 22. The narrow-width section 25 continuously extends from the other end of the clamp body 21 to the end of the other tab 23. A portion of the narrow-width section 25 has a narrower width than the opening width of the first opening hole 24 and is inserted into the first opening hole 24.

As shown in FIG. 3, the clamp member 20 clamps the shield member 15 to the shield shell 12 from the outer periphery of the shield member 15. When the clamp body 21 is in the clamped state, it forms a laterally elongated circular ring in a front view. The shield shell 12 includes straight shape sections 13a, 13b and curved shape sections 13c, 13d. The clamp body 21 includes straight corresponding sections 21a1, 21a2, 21b corresponding to the straight shape sections 13a, 13b of the shield shell 12 and includes curved corresponding sections 21c, 21d corresponding to the curved shape section 13c, 13d of the shield shell 12. The second straight corresponding section 21b is located away from the tabs 22 and 23, e.g., positioned on the opposite side of the tabs 22, 23 in the radial direction.

As shown in FIG. 3, the first straight corresponding section (also referred to as the half-corresponding section) 21a1 corresponds to one half section (e.g., the right half section) of the first straight shape section 13a of the tubular portion 13 of the shield shell 12. The first straight corresponding section (also referred to as the half-corresponding section) 21*a*2 corresponds to the other of one half section (e.g., left half section) of the first straight shape section 13*a* of the tubular portion 13. As shown in FIG. 6, one first straight corresponding section 21*a*1 is located in a region 21A1 of the clamp body 21 adjacent one of the tabs (e.g., tab 22). The other first straight half-corresponding section 21*a*2 is located in a region 21A2 of the clamp body 21 adjacent to the other tab 23.

As shown in FIG. 3, the second straight corresponding section 21*b* corresponds to the second straight shape section 13*b* of the tubular portion 13. The first curved corresponding section 21*c* corresponds to the first curved shape section 13*c* of the tubular portion 13. The second curved corresponding section 21*d* corresponds to the second curved shape section 13*d* of the tubular portion 13. As shown in FIG. 6, the second straight corresponding section 21*b* is located in a middle region 21B of the clamp body 21. The first curved corresponding section 21*c* is located in a region 21C close to the left of the clamp body 21. The second curved corresponding section 21*d* is located in a region 21D close to the right of the clamp body 21.

In FIG. 6, a first center line L1 is the center line of the clamp body 21 in the longitudinal direction (e.g., length direction). A second center line L2 is the center line of the clamp member 20 in the width direction and that intersects the first center line L1.

As shown in FIGS. 4 and 6, in the middle of the second straight corresponding section 21*b*, a straight bead 26 is formed that extends along the second center line L2. The bead 26 is formed to have a V-shaped cross-section and is raised toward the outside, e.g., in a downward direction (see FIG. 2). Forming the bead 26 enhances the rigidity of the second straight corresponding section 21*b*.

Referring to FIG. 6, the rigidity of the first curved corresponding section 21*c* is relatively weaker, for instance due to the reduced width of the narrow-width section 25. The second curved corresponding section 21*d* is formed with a second opening hole 27 extending along the second center line L2. The second opening hole 27 weakens the rigidity of the second curved corresponding section 21*d*. Therefore, the second straight corresponding section 21*b* is less likely to bend than either of the curved corresponding sections 21*c*, 21*d*.

As shown in FIG. 6, the second opening hole 27 is formed line-symmetrical about the second center line L2. About half of the second opening hole 27, for example the half closer to the tab 22 closer the opening hole 24, has the same or substantially the same opening width as the first opening hole 24. The other (about) half of the second opening hole 27 is tapered such that the opening width is reduced toward the first center line L1.

Figure 5:
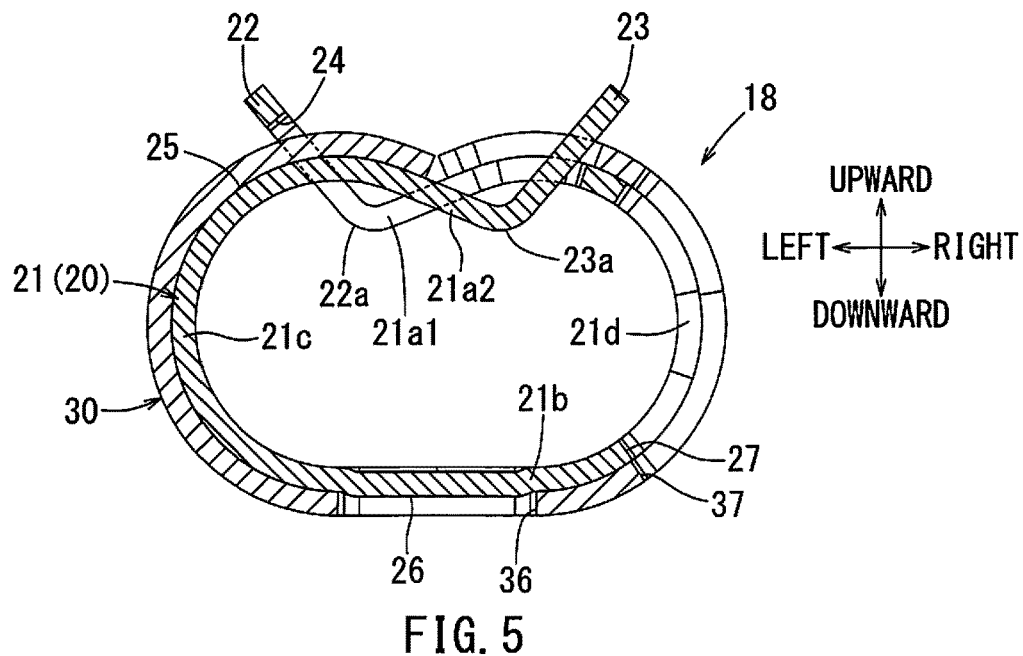
FIG. 5 is a front cross-sectional view of the clamp corresponding to that shown in FIG. 3 in the free state.

As shown in FIG. 5, when the clamp member 20 is in a free state, the clamp body 21 is contracted and the pair of the tabs 22, 23 are spaced apart from one another. Further, base ends 22*a*, 23*a* of the pair of tabs 22, 23 project radially inward (e.g., downward in FIG. 5) of the clamp body 21. In other words, the base ends 22*a*, 23*a* form bent sections of the pair of tabs 22, 23.

Figure 8:
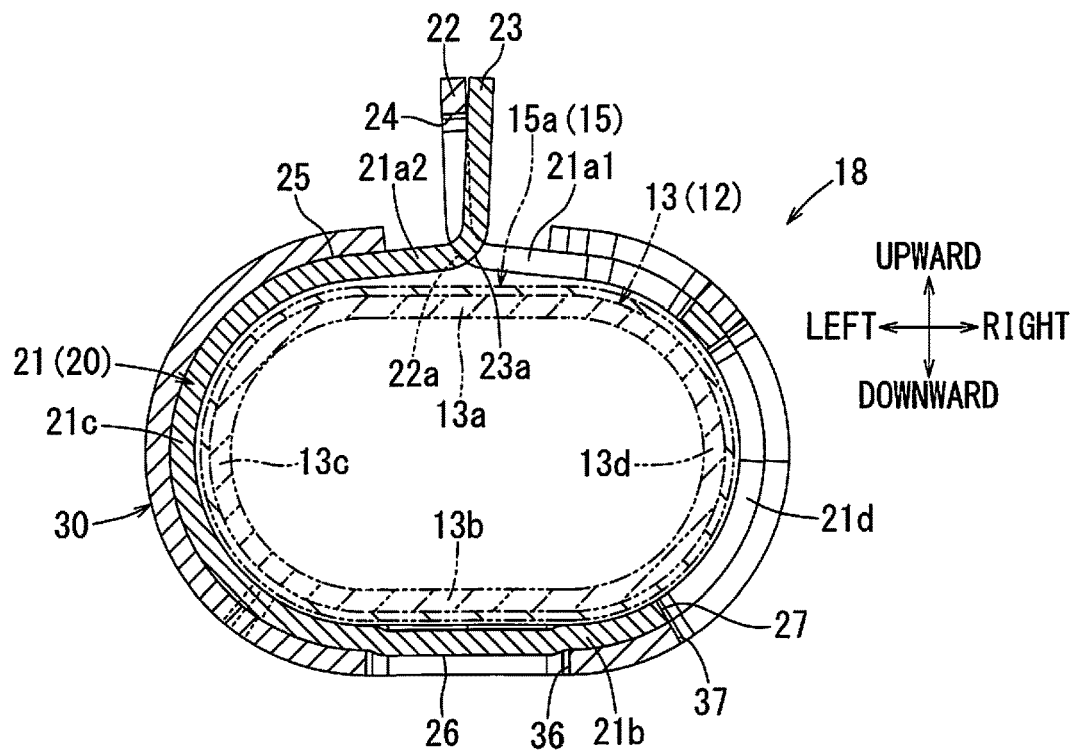
FIG. 8 is a front cross-sectional view of the clamp in an enlarged state.

The pair of tabs 22, 23 may be biased in a mutually approaching direction using a tool (not shown), such as a plier, so as to come in contact or come into close contact with each other. In this way, the clamp member 20 may be elastically deformed from the free state, shown in FIGS. 4 and 5, so as to enter the expanded state, shown in FIG. 8. As shown in FIG. 8, one end 15*a* of the shield member 15 is positioned to cover the tubular portion 13 of the shield shell 12. The clamp body 21, when in the expanded state, can be fitted to one end 15*a* of the shield member 15, with a slight gap therebetween. When the clamp member 20 is deformed so as to be in the expanded state, the base ends 22*a*, 23*a* of the pair of tabs 22, 23 are shifted radially outward (upward in FIG. 8) of the clamp body 21 as compared to the free state.

As shown in FIGS. 4 and 5, the back-up member 30 overlaps the outer peripheral side of the clamp body 21 of the clamp member 20 in a layered manner. The back-up member 30 is formed of a leaf spring material made of a metal strip and has substantially a C-shape. The back-up member 30 is formed in a shape so as to substantially correspond to the shape of the clamp member 20, excluding the pair of tabs 22, 23. That is, the back-up member 30 may have a shape substantially the same as the clamp body 21. The back-up member 30 is configured to elastically bias the clamp body 21 in the contracting direction. The back-up member 30 serves to support the fastening force of the clamp body 21 and is configured to elastically deform integrally with the clamp body 21.

Figure 7:
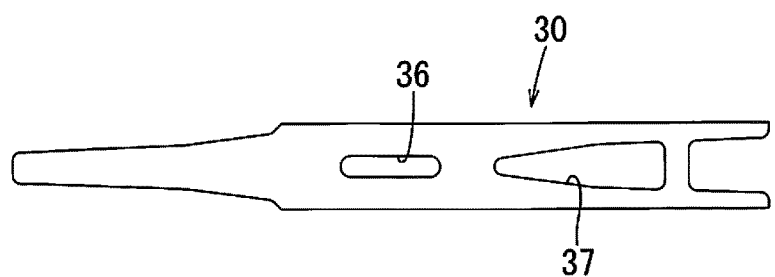
FIG. 7 is a flattened view of a back-up member (e.g., an outer clamp member).

As shown in FIG. 7, the back-up member 30 is formed with an elongated engagement hole 36. As shown in FIGS. 2 and 5, the engagement hole 36 is formed in a shape and at a position corresponding to the bead 26 (see FIG. 6) of the clamp body 21. The bead 26 engages with the engagement hole 36. This configuration may prevent the back-up member 30 from being displaced from the clamp body 21 in an axial direction. In addition, the bead 26 engaging the engagement hole 36 serves to improve close-contact between the clamp member 20 and the back-up member 30.

As shown in FIG. 7, the back-up member 30 is formed with an opening hole 37, which is positioned to correspond with the second opening hole 27 of the clamp body 21, shown in FIG. 6. The opening hole 37 is formed to be aligned with the second opening hole 27 of the clamp member 20 in the radial direction. For example, the opening hole 37 is formed to be longer than the second opening hole 27 in the longitudinal direction.

Hereinafter, an embodiment of a method of connecting the shield member 15 to the shield shell 12 will be described. Firstly, referring to FIG. 5, the pair of tabs 22, 23 of the clamp 18 are moved from the free state to approached each other and held in an approached position by a tool (not shown), such as pliers. In this way, as shown in FIG. 8, the clamp 18 can be brought into the expanded state by elastically deforming the clamp 18. In this expanded state, the clamp 18 may be fitted on one end 15*a* of the shield member 15, which is covering the tubular portion 13 of the shield shell 12. More specifically, a portion of the shield member 15 is inserted through the clamp 18 in advance. The one end 15*a* of the shield member 15 extending through the clamp 18 is stretched to cover the tubular portion 13 of the shield shell 12. Subsequently, while the clamp 18 is maintained in the expanded state by elastically deforming it using the tool, the clamp 18 is moved to be fitted over the one end 15*a* of the shield member 15.

Next, referring to FIG. 8, the pair of tabs 22, 23 being held by the tool (not shown) are released. Thereby, referring to FIG. 3, the clamp 18 contracts due to its own elastic restoring force, specifically, the elastic restoring force of the clamp body 21 and the back-up member 30. As a result, the one end 15*a* of the shield member 15 is elastically fastened over substantially the entire periphery of the tubular portion 13 of the shield shell 12 by the elastic force of the clamp 18.

As shown in FIG. 3, both of the first straight half-corresponding sections 21*a*1, 21*a*2 of the clamp body 21 come in close contact with the first straight shape section 13a of the tubular portion 13 of the shield shell 12, with the shield member 15 held therebetween. The second straight corresponding section 21b comes in close contact with the second straight shape section 13b of the tubular portion 13 of the shield shell 12, with the shield member 15 interposed therebetween, such that the contact pressure between the two (13b and 15) is ensured. The first curved corresponding section 21c comes in close contact with the first curved shape section 13c of the tubular portion 13, with the shield member 15 held therebetween. The second curved corresponding section 21d comes in close contact with the second curved shape section 13d of the tubular portion 13, with the shield member 15 held therebetween. As a result of being so held, the shield member 15 may be maintained in a condition where the shield member 15 is conductively connected to the shield shell 12.

Referring to FIG. 8, it is preferable to release the pair of tabs 22, 23 being held by the tool while the second straight corresponding section 21b of the clamp body 21 is held against the second straight shape section 13b side of the tubular portion 13 of the shield shell 12.

Referring to FIG. 3, the clamp 18 has an elastic restoring force caused by the elastic deformation of the clamp 18, specifically, due to the clamp body 21 of the clamp member 20 and the back-up member 30. The clamp 18 may fasten the shield member 15 to the tubular portion 13 of the shield shell 12 utilizing its own elastic restoring force. On the other hand, utilizing a conventional ring member requires some additional work, such as applying a fastening force, fastening a wire portion, or turning an endless screw. However, according to the structure described above, it is possible to omit the troublesome, additional work that has been conventionally required. As a result, the shield member 15 can be easily attached to the shield shell 12.

As shown in FIG. 8, the second straight corresponding section 21b is configured to be less likely to bend than both of the curved corresponding sections 21c, 21d, for example, because of the presence of the bead 26. Therefore, it is possible to prevent the second straight corresponding section 21b from becoming bent or plastically deformed when the diameter of the clamp body 21 is enlarged due to pinching the pair of tabs 22, 23. As a result, close-contact between the second straight corresponding section 21b of the clamp body 21 and the shield member 15 may be improved. In addition, close-contact between the shield member 15 and the second straight shape section 13b of the tubular portion 13 can be improved. In other words, it is possible to prevent a gap from being formed between the second straight corresponding section 21b and the shield member 15 as well as between the second straight shape section 13b of the tubular portion 13 of the shield shell 12 and the shield member 15 coupled with the elastic restoring force of the both curved corresponding sections 21c, 21d of the clamp body 21. In this way, the contact pressure between the two (13b and 15) can be ensured.

As shown in FIG. 8, the second straight corresponding section 21b is configured to bend less easily than either curved corresponding section 21c, 21d. Therefore, both of the curved corresponding sections 21c, 21d bend more than the second straight corresponding section 21b, when enlarging the diameter of the clamp body 21. In this way, the size of both of the curved corresponding sections 21c, 21d can be increased in the diameter enlarging direction. As a result, the clamp 18 can be elastically deformed while having a shape better corresponding to the tubular portion 13 of the shield shell 12. The clamp body 21 is therefore easily attached to the shield member 15.

As shown in FIG. 3, the clamp 18 fastens the shield member 15 to the tubular portion 13 of the shield shell 12 using the elastic restoring force of the clamp 18, for example, the elastic restoration force of the clamp body 21. Therefore, the clamp body 21 expands or contracts when the tubular portion 13 expands or contracts. This may prevent a reduction in the fastening force, while ensuring the contact pressure between the two (13b and 15).

As shown in FIGS. 3 and 8, the second straight corresponding section 21b and the pair of tabs 22, 23 are disposed at opposite positions of each other in the radial direction. Thus, the pair of tabs 22, 23 can be operated by pinching, with the second straight corresponding section 21b functioning as the base section.

As shown in FIGS. 3 and 5, base ends 22a, 23a of the tabs 22, 23 project radially inward from the clamp body 21 in a free state. Therefore, the base ends 22a, 23a of the tabs 22, 23 allow the shield member 15 to be elastically pressed against the tubular portion 13 utilizing the elastic force of the clamp 18.

As shown in FIG. 3, the clamp 18 fastens the shield member 15 to the tubular portion 13 of the shield shell 12 by the elastic restoring force of the clamp 18, for example, the elastic restoration force of the clamp body 21. On the other hand, a conventional ring member is configured to apply a fastening force by utilizing additional work equipment. Therefore, since this structure requires no additional work equipment, the shield member 15 can be easily fastened to the shield shell 12.

As shown in FIGS. 5 and 8, the second straight corresponding section 21b is configured to less easily bend than either of the curved corresponding sections 21c, 21d. Therefore, the second straight corresponding section 21b can be more easily aligned with respect to the second straight shape section 13b of the tubular portion 13 when the clamp 18 is in the expanded state. Further, close-contact with the shield member 15 can be ensured by preventing the plastic deformation of the second straight corresponding section 21b. As shown in FIG. 3, a reduction in the fastening force of both curved corresponding sections 21c, 21d may be prevented because the second straight corresponding section 21b was prevented from being bent when the clamp 18 was expanded for fastening the shield member 15.

Figure 9:
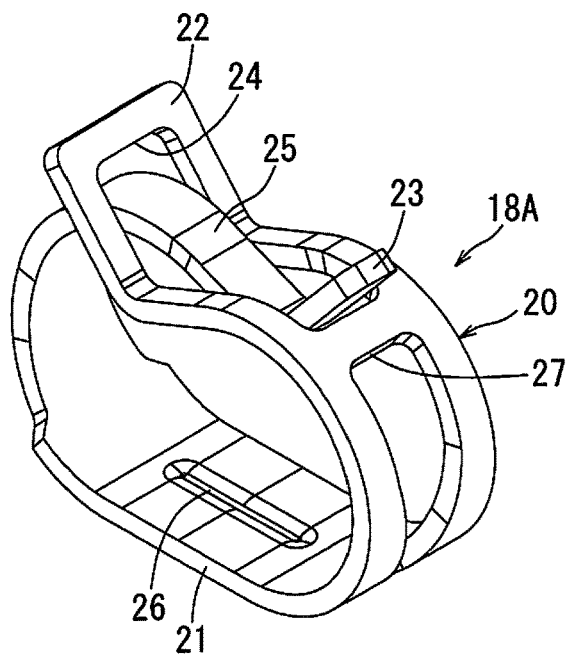
FIG. 9 is a perspective view of a second embodiment of a clamp in the free state.
Figure 10:
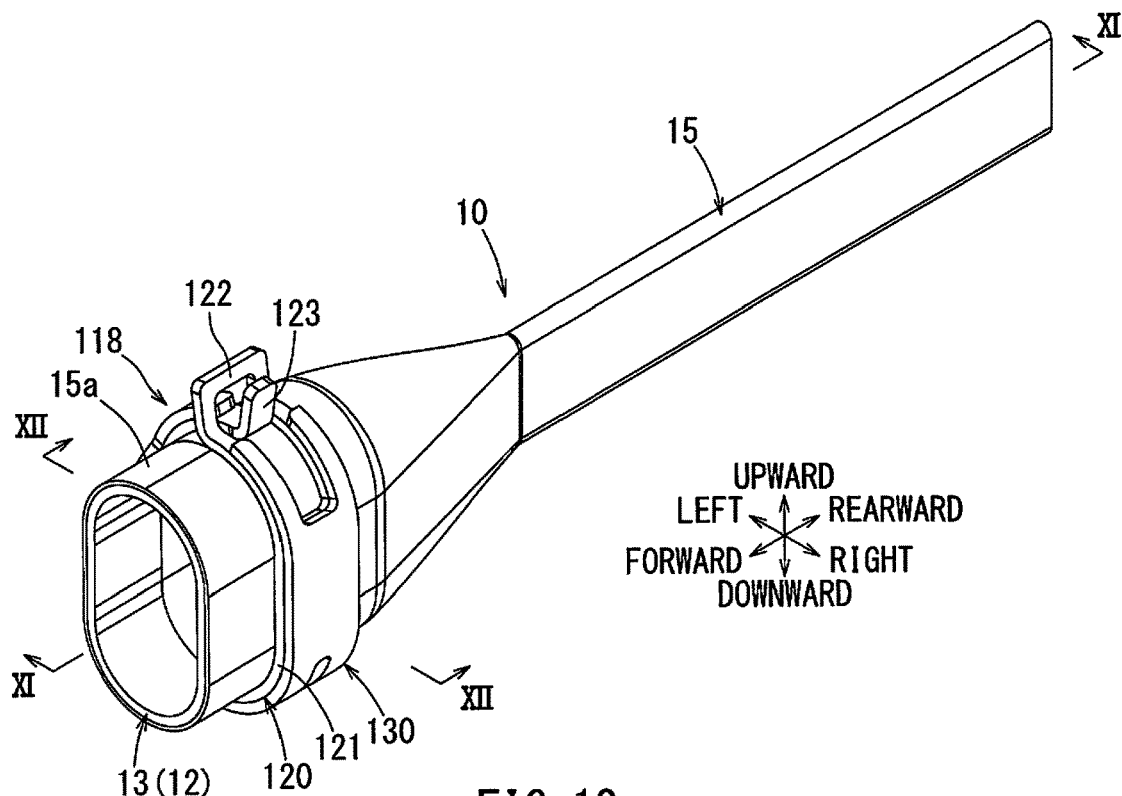
FIG. 10 is a perspective view of a tubular connecting member covering the counter member and a third embodiment of a clamp attached to the tubular connecting member.
Figure 11:
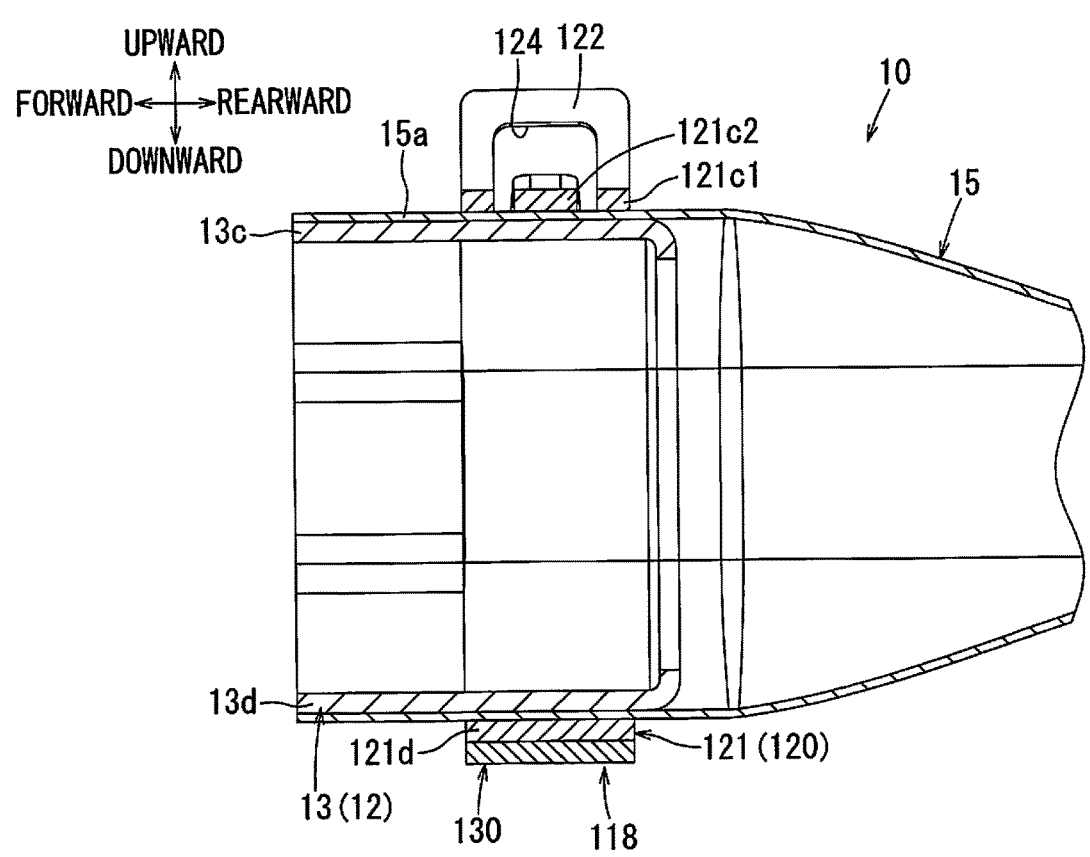
FIG. 11 is a cross-sectional view taken along a line XI-XI of FIG. 10.

A second embodiment will be described with reference to FIG. 9. Since the second embodiment is merely a modification of the clamp 18 of the first embodiment, only the modified sections will be described, with the same components being denoted by the same reference numerals and not being described. As can be seen by comparing FIG. 4 with FIG. 9, the clamp 18A according to the second embodiment is comprised of only the clamp member 20, lacking the back-up member 30 of the first embodiment.

A third embodiment will be described with reference to FIGS. 10 to 17. As the third embodiment is a modification of the clamp 18 of the first embodiment, only the modified sections will be described and the components the same as those of the first embodiment will be denoted by the same reference numerals and not be described. As can be seen by comparing FIGS. 1 and 3 with FIGS. 10 and 12, a longer diameter direction of the tubular portion 13 of a clamp 118 according to the third embodiment is oriented in an up-to-down direction, while a longer diameter direction of the tubular portion 13 of the clamp 18 according to the first embodiment is oriented in a left-to-right direction.

Figure 13:
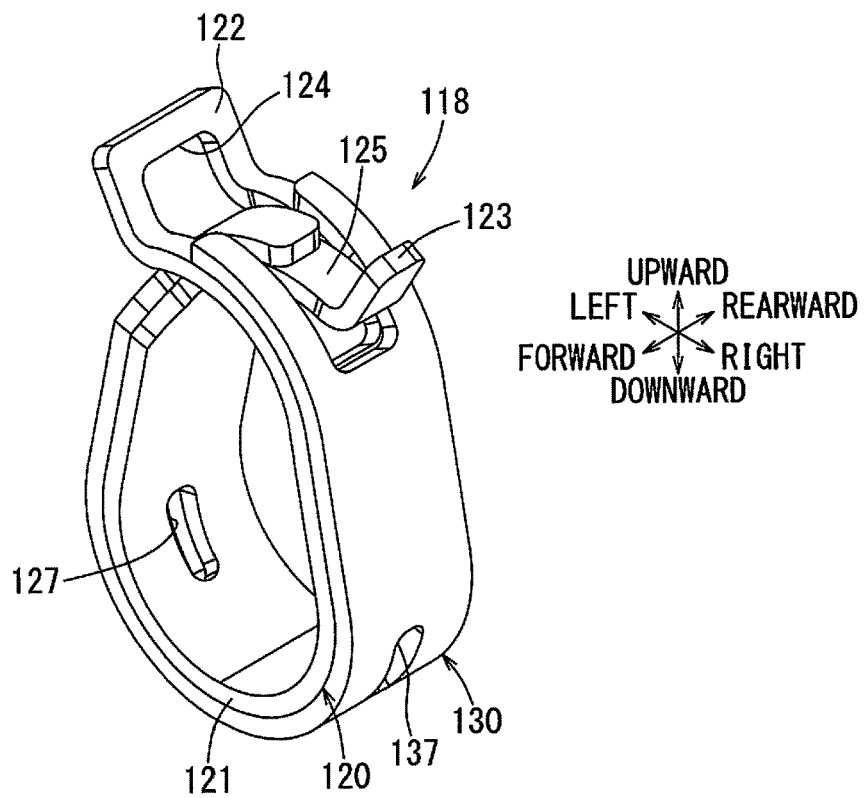
FIG. 13 is a perspective view of the clamp of FIG. 10 in a free state.

As shown in FIG. 13, the clamp 118 comprises a clamp member 120 constituting its main body and a back-up member 130 configured to enhance the fastening force of the clamp member 120. The clamp member 120 is formed of a leaf spring material made of a metal strip. The clamp member 120 includes a clamp body 121 formed in substantially a C-shape and a pair of tabs 122, 123. The opposite ends of the clamp body 121 intersect one another. The tabs 122, 123 project radially outward from the opposite ends of the clamp body 121.

Figure 15:
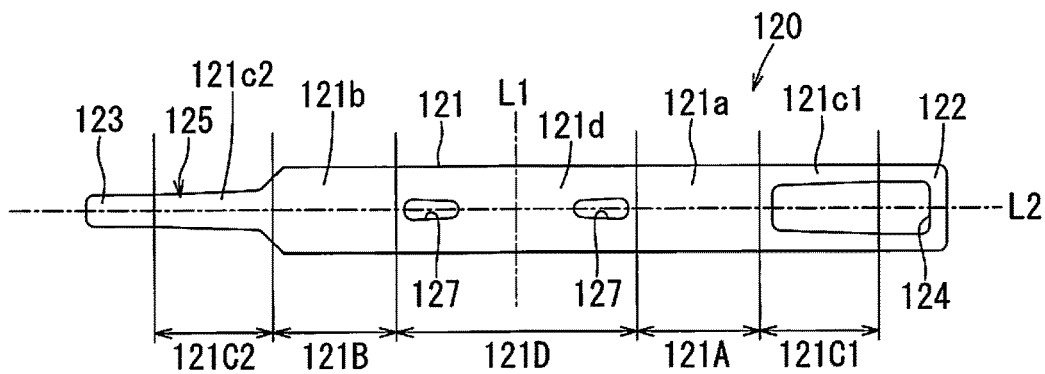
FIG. 15 is a flattened view of a clamp member (e.g., an inner clamp member) of FIG. 10.

As shown in FIG. 15, the flattened clamp member 120 has a plate shape. The clamp member 120 includes a first opening hole 124 shaped as an elongated rectangular hole and a narrow-width section 125 having a single leg shape. The first opening hole 124 extends from one end of the clamp body 121 to one of the tabs (e.g., tab 122). The narrow-width section 125 continuously extends from the other end of the clamp body 121 to the other tab 123.

Figure 12:
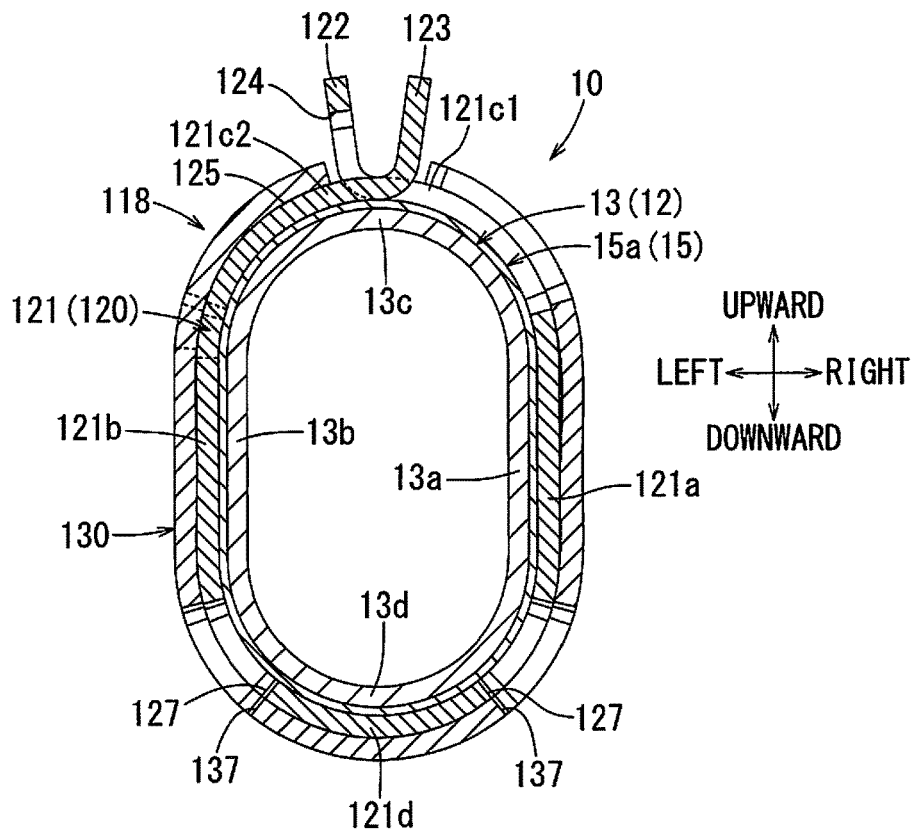
FIG. 12 is a cross-sectional view taken along a line XII-XII of FIG. 10.

As shown in FIG. 12, the clamp body 121 forms a vertically elongated circular ring in a front view when in the state where the shield member 15 is clamped to the shield shell 12. The clamp body 121 includes straight corresponding sections 121a, 121b corresponding to the straight shape sections 13a, 13b of the tubular portion 13 of the shield shell 12, and curved corresponding sections 121c1, 121c2, 121d corresponding to the curved shape sections 13c, 13d of the tubular portion 13. The second curved corresponding section 121d and the pair of tabs 122, 123 are disposed at opposite positions of each other in the radial direction (the up-to-down direction in FIG. 12).

As shown in FIG. 12, the first straight corresponding section 121a corresponds to the first straight shape section 13a of the tubular portion 13. The second straight corresponding section 121b corresponds to the second straight shape section 13b of the tubular portion 13. As shown in FIG. 15, the first straight corresponding section 121a is located in a region 121A of the clamp body 121. The second straight corresponding section 121b is located in another region 121B of the clamp body 121.

As shown in FIG. 12, the first curved half-corresponding section 121c1 corresponds to one half section (e.g., the right half section) of the first curved shape section 13c of the tubular portion 13. The other first curved half-corresponding section 121c2 corresponds to the other one half (e.g., the left half section) of the first curved shape section 13c of the tubular portion 13. The second curved corresponding section 121d corresponds to the second curved shape section 13d of the tubular portion 13. As shown in FIG. 15, the first curved half-corresponding section 121c1 is located in a region 121C1 of the clamp body 121, which is adjacent to one of the tabs (e.g., tab 122). The other first curved half-corresponding section 121c2 is located in another region 121C2 of the clamp body 121, which is adjacent to the other tab 123. The second curved corresponding section 121d is located in a middle region 121D of the clamp body 121.

As shown in FIG. 15, a first opening hole 124 is formed in the clamp member 120. Approximately one half of the first opening hole 124 is located in the first curved half-corresponding section 121c1 and the majority of the other half of the first opening hole 124 is located in the tab 122. Therefore, the rigidity of the first curved half-corresponding section 121c1 is relatively weaker due to the first opening hole 124. The narrow-width section 125 is formed at the other first curved half-corresponding section 121c2. Therefore, the rigidity of the other first curved half-corresponding section 121c2 is relatively weaker due to the narrow-width section 125. Further, a pair of second left and right opening holes 127 extending along a second center line L2 are formed at the second curved corresponding section 121d. In this way, the rigidity of the second curved corresponding section 121d is relatively weaker. Therefore, both of the straight corresponding sections 121a, 121b are configured to bend less easily than both of the first curved half-corresponding sections 121c1, 121c2 and the second curved corresponding section 121d.

As shown in FIG. 15, both of the second opening holes 127 are formed in a line-symmetrical shape about a first center line L1. The second opening holes 127 are also formed in a line-symmetrical shape about the second center line L2. The second opening holes 127 are formed to be tapered such that the opening widths increase as they move away from the first center line L1.

Figure 14:
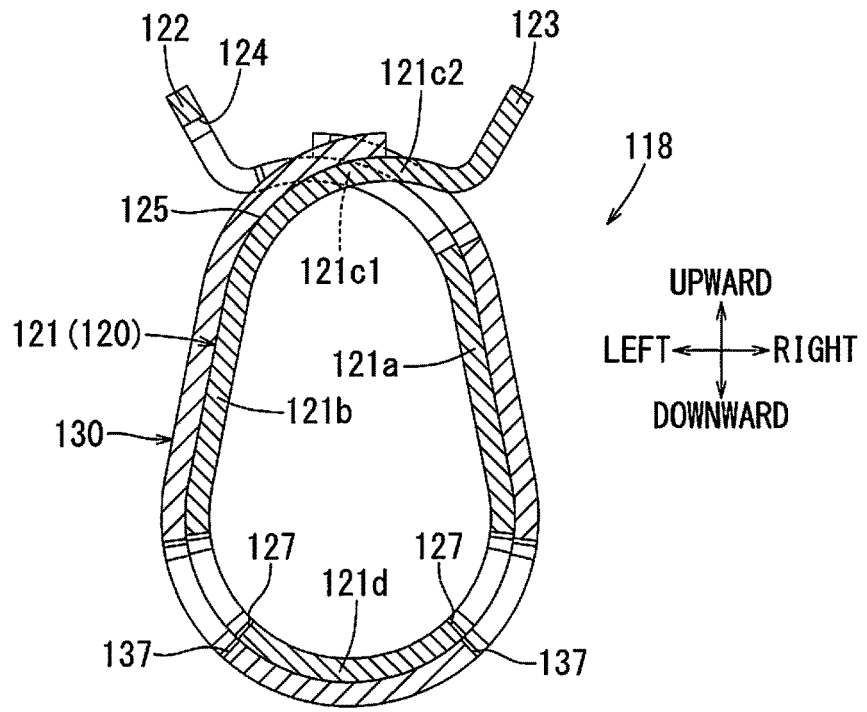
FIG. 14 is a front cross-sectional view of the clamp of FIG. 10.

As shown in FIG. 14, the clamp body 121 is contracted and the pair of tabs 122, 123 are spaced apart from one another when the clamp 118 is in a free state. The pair of tabs 122, 123 come in contact or come in close contact with each other when they are pressed in a mutually approaching direction using a tool (not shown), such as pliers. In this way, the clamp member 120 may be elastically deformed from the free state shown in FIG. 14 to the expanded state shown in FIG. 17. One end 15a of the shield member 15 is positioned to cover the tubular portion 13 of the shield shell 12. The clamp body 121 in the expanded state can be fitted over one end 15a of the shield member 15 with a slight gap therebetween.

As shown in FIGS. 13 and 14, the back-up member 130 overlaps an outer peripheral side of the clamp body 121 of the clamp member 120 in a layered manner. The back-up member 130 is formed of a leaf spring material made of a metal strip and is formed with substantially a C-shape. The back-up member 130 is formed with a shape so as to substantially correspond to the shape of the sections of the clamp member 120, excluding the pair of tabs 122, 123. For example, the back-up member 130 may have a shape corresponding to the clamp body 121. The back-up member 130 elastically biases the clamp body 121 in the diameter reducing direction of the clamp body 121. The back-up member 130 serves to support the fastening force of the clamp body 121 and is elastically deformed integrally with the clamp body 121.

Figure 16:
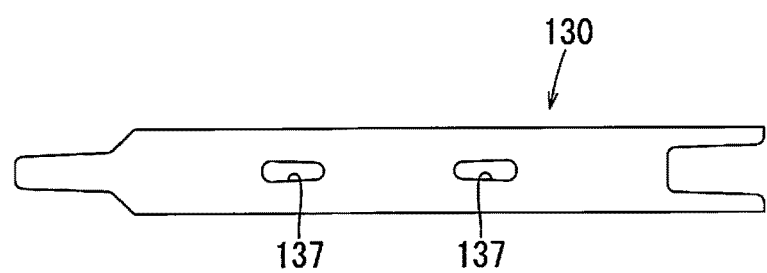
FIG. 16 is a flattened view of a back-up member (e.g., an outer clamp member) of FIG. 10.

As shown in FIG. 16, a pair of opening holes 137 are formed in the back-up member 130. The opening holes 137 are located so as to correspond to the respective second opening holes 127 (see FIG. 15) of the clamp body 121. The opening holes 137 have a shape corresponding to the second opening holes 127. As shown in FIG. 12, the opening holes 137 are formed to be continuous and aligned with the second opening holes 127 of the clamp member 120 in the radial direction. For example, the opening holes 137 are longer in the longitudinal direction than the second opening holes 127.

From the free state shown in FIG. 14, the pair of tabs 122, 123 of the clamp 118 are made to approach each other by a tool (not shown), such as pliers, when the shield member 15 is to be connected to the shield shell 12. As a result, the clamp 118 is elastically deformed so as to enter the expanded state, shown in FIG. 17. The clamp 118 is then positioned to cover one end 15a of the shield member 15, while maintaining the clamp 118 in the expanded state. More specifically, for example, the shield member 15 is inserted into the clamp 118 in advance of expanding the clamp 118. One end 15a of the shield member 15 extending beyond the clamp 118 is positioned to cover the tubular portion 13 of the shield shell 12. Subsequently, the clamp 118 is fitted to the one end 15a of the shield member 15 while the clamp 118 is being elastically deformed by the tool so as to be maintained in the expanded state during the fitting process.

Figure 17:
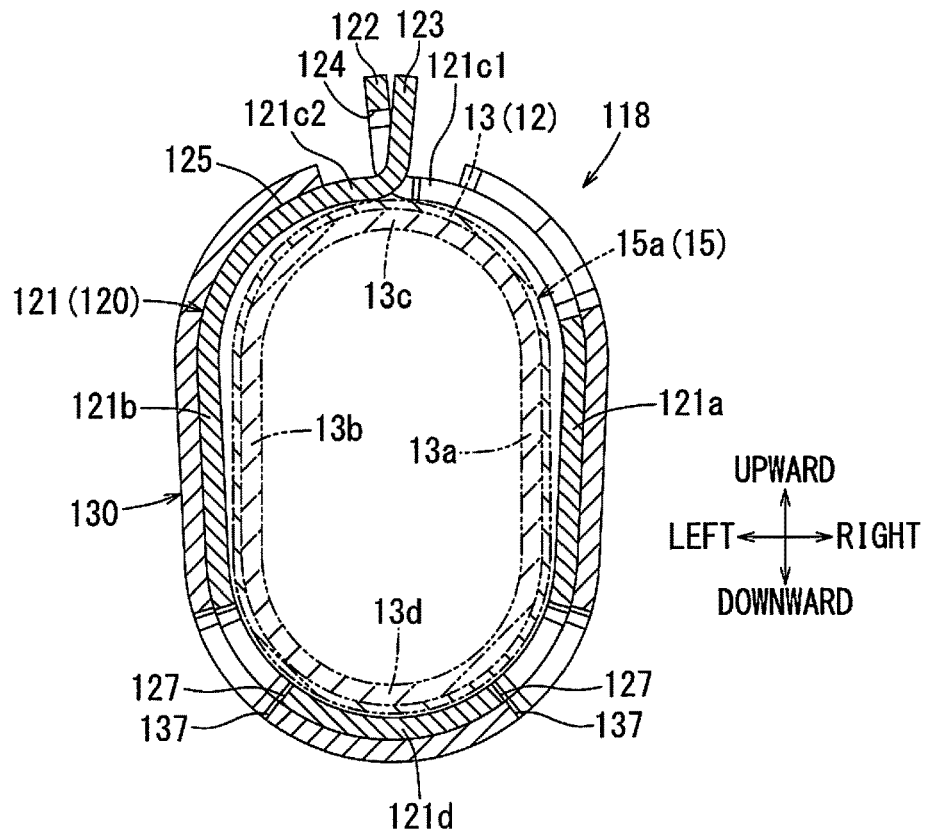
FIG. 17 is a front cross-sectional view of the clamp of FIG. 10 in an expanded state.

Next, from the expanded state shown in FIG. 17, the pair of tabs 122, 123 are released by the tool (not shown). Consequently, as shown in FIG. 12, the clamp 118 contracts due to its own elastic restoring force, for example, the elastic restoring force of the clamp body 121 and the back-up member 130. As a result, the one end 15a of the shield member 15 is held over substantially the entire periphery of the tubular portion 13 of the shield shell 12 by the elastic restoration force of the clamp 118 alone. Accordingly, a similar effect as the above-described first embodiment can be obtained with the third embodiment.

Referring to FIG. 17, it is preferable to release the pair of tabs 122, 123 being held by the tool while the second curved corresponding section 121d of the clamp body 121 is pressed against the second curved shape section 13d side of the tubular portion 13 of the shield shell 12.

As shown in FIG. 12, the clamp 118 fastens the shield member 15 to the tubular portion 13 of the shield shell 12 by the elastic restoring force of the clamp 118 alone, specifically, that of the clamp body 121 of the clamp member 120 and the back-up member 130. Consequently, conventionally required troublesome work, such as swaging of a ring member, tightening of a wire, screwing of a worm screw, etc., can be omitted. As a result, the shield member 15 can be easily fastened to the tubular portion 13 of the shield shell 12 using the clamp 118.

Referring to FIG. 17, both of the second straight corresponding sections 121a, 121b are configured to bend less easily than both the first curved half-corresponding sections 121c1, 121c2 and the second curved corresponding section 121d. Therefore, it is possible to prevent both straight corresponding sections 121a, 121b from bending or plastically deforming when the diameter of the clamp body 121 is enlarged due to pinching the pair of tabs 122, 123. As shown in FIG. 12, close-contact between each of the straight corresponding sections 121a, 121b of the clamp body 121 and the shield member 15 can be improved. In addition, close-contact between the shield member 15 and the straight shape sections 13a, 13b can be improved. In other words, the elastic restoring force of the first curved half-corresponding sections 121c1, 121c2 and the second curved corresponding section 121d are coupled with an inflexible straight corresponding section 121a, 121b. This may prevent a gap from being formed between the straight corresponding sections 121a, 121b and the shield member 15, and may further prevent a gap between the straight shape sections 13a, 13b of the shield shell 12 and the shield member 15. In this way, the contact pressure between the two (13 and 15) can be ensured.

Referring to FIG. 17, both of the straight corresponding sections 121a, 121b are configured to bend less easily than both of the first curved half-corresponding sections 121c1, 121c2, as well as than the second curved corresponding section 121d. Therefore, both the first curved half-corresponding sections 121c1, 121c2 and the second curved corresponding section 121d bend more easily than both straight corresponding sections 121a, 121b, when enlarging the diameter of the clamp body 121. In this way, the size of both of the first curved half-corresponding sections 121c1, 121c2 and the size of the second curved corresponding section 121d can be increased in the diameter enlarging direction. As a result, the clamp 118 can be elastically deformed to have a shape corresponding to the tubular portion 13 of the shield shell 12. The clamp body 121 is therefore easily attached to the shield member 15.

Referring to FIG. 12, the clamp 118 fastens the shield member 15 to the tubular portion 13 of the shield shell 12 by the elastic restoring force of the clamp 118 alone, specifically, by the clamp body 121. Therefore, the clamp body 121 expands or contracts in conjunction with the tubular portion's 13 expansion or contraction. As a result, it is possible to prevent a reduction of the fastening force while ensuring contact pressure between the two (13 and 15).

As shown in FIG. 14, the second curved corresponding section 121d and the pair of tabs 122, 123 are disposed at opposing positions of each other in the radial direction. Thus, the pair of tabs 122, 123 can be pinched to operate the clamp 118, with the second curved corresponding section 121d serving as a base.

As shown in FIG. 14, a curved region defined by both of the first curved half-corresponding sections 121c1, 121c2 is formed to have a smaller diameter in a free state than that of a curved region of the second curved corresponding section 121d. As shown in FIG. 17, when the clamp 118 is placed in an expanded state due to the elastic deformation thereof, a bottom portion (lower end portion in FIG. 17) of the second curved corresponding section 121d serves substantially as a fulcrum to allow the first curved half-corresponding sections 121c1, 121c2 to be expanded thereabout. Therefore, the size of the clamp body 121 in the longer diameter direction (up-to-down direction in FIG. 17) is temporally increased. Consequently, the size of the clamp body 121 in the longer diameter direction is reduced in a state where the clamp 118 contracts due to its own elastic restoring force, thereby fastening the shield member 15. Therefore, the clamp 118 can fasten the shield member 15 in the longer diameter direction by the elastic restoring force of the clamp 118, specifically, the clamp body 121.

Figure 18:
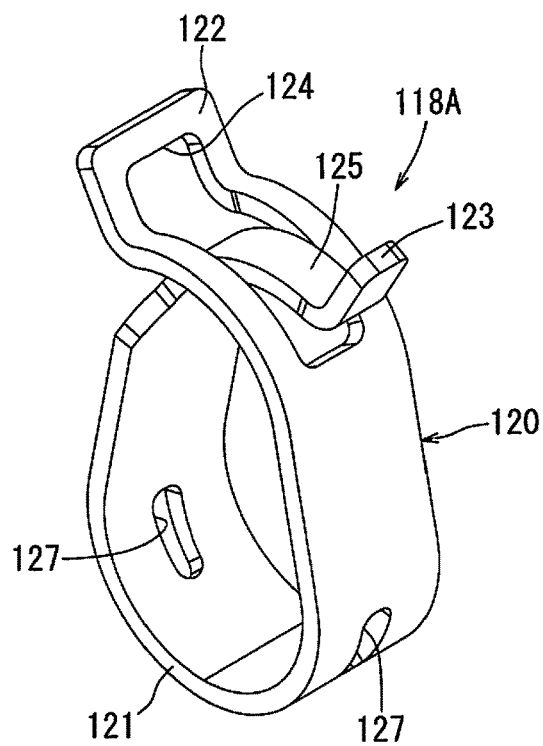
FIG. 18 is a perspective view of a fourth embodiment of a clamp in a free state.

A fourth embodiment will be described with reference to FIG. 18. Since the fourth embodiment is a modification of the third embodiment, only the modified sections will be described. The same components as those of the first embodiment will be denoted by the same reference numerals and will not be described. As can be seen by comparing FIG. 13 with FIG. 18, the clamp 118A according to the fourth embodiment is comprised of only the clamp member 120, omitting the back-up member 130 of the third embodiment.

The present disclosure shall not be limited to the above-described embodiments. For example, a clamp shall not be limited to a shield connector, but may be configured to fasten a tubular connecting member to a counter member. For example, the clamp may be adopted to clamp mutual pipes or mutual wires.

The clamp may include a holding member configured to hold a pair of tabs in a pinched state. The holding member may be detachably provided to the tabs or other component. The clamp is elastically restored once the holding member is detached from the tabs, or the like, thereby allowing the clamp to fasten the tubular connecting member to the counter member. With this structure, a pinching operation of the pair of tabs may be performed tool-free.

The clamp shall not be required to be made of metal, but may be made of resin. Further, the rigidity at the straight corresponding section of the clamp body may be reinforced by the bead 26 shown in FIG. 4. However, the straight corresponding section instead may be reinforced by other means. For example, it may also be reinforced by forming a rib(s), increasing the thickness, increasing the width, performing surface treatment, or the like. Further, the rigidity of the curved corresponding section may be weakened by including the second opening hole 27 shown in FIG. 4, or other means such as by reducing the thickness, reducing the width, or the like.

A cross-sectional shape in a direction orthogonal to an axial direction of the tubular portion 13 of the shield connector 10 is not limited to a rectangular shape with rounded corners. Instead, the shape may include a shape having one straight section and one curved section connected to both of its ends or may include a shape having three straight sections and three curved sections which are respectively connected between the ends of the adjacent straight sections. Further, a cross-sectional shape in a direction orthogonal to the axial direction of the tubular portion 13 may have an elliptical shape that has shorter sides corresponding to the curved sections and longer sides corresponding to the straight sections.

The various examples described above in detail with reference to the attached drawings are intended to be representative of the present disclosure and are thus non-limiting embodiments. The detailed description is intended to teach a person of skill in the art to make, use and/or practice various aspects of the present teachings and thus does not limit the scope of the disclosure in any manner. Furthermore, each of the additional features and teachings disclosed above may be applied and/or used separately or with other features and teachings in any combination thereof to provide an improved clamp, and/or methods of making and using the same.

The invention claimed is:

1. A clamp for fastening a tubular connecting member to a counter member by the elastic restoring force of the clamp alone, the clamp comprising:
   an annular clamp body with opposite ends intersecting; and
   a pair of tabs, each of the pair of tabs projecting radially outward from each of the opposite ends of the clamp body, wherein:
      the clamp body includes a straight corresponding section and a curved corresponding section,
      the straight corresponding section is formed so as to bend less easily than the curved corresponding section when the clamp is transitioning from a free state to an expanded state, and
      the straight corresponding section includes a bead projecting radially outward of the clamp body.

2. The clamp according to claim 1, wherein the straight corresponding section and the pair of tabs are disposed at opposing positions to each other in a radial direction.

3. The clamp according to claim 2, wherein each base end of the pair of tabs is formed to project radially inward of the clamp body when the clamp is in the free state.

4. The clamp according to claim 1, wherein the curved corresponding section and the pair of tabs are disposed at opposing positions to each other in a radial direction.

5. The clamp according to claim 1, wherein the curved corresponding section includes an opening formed therein.

6. The clamp according to claim 1, wherein the curved corresponding section has a smaller width than that of the straight corresponding section.

7. A clamp, comprising:
   a clamp body having opposing straight corresponding sections and a curved corresponding section between the straight corresponding sections; and
   a pair of tabs, each of the pair of tabs projecting radially outward from each opposite ends of the clamp body, wherein:
   both of the straight corresponding sections are more rigid than the curved corresponding section.

8. The clamp according to claim 7, wherein the more rigid straight corresponding section is positioned opposite to the pair of tabs in a radial direction of the clamp body.

9. The clamp according to claim 7, wherein the clamp body has a stadium cross-sectional shape when in an expanded state.

10. The clamp according to claim 9, wherein opposite ends of the clamp body project radially inward when in a free state.

11. The clamp according to claim 7, wherein the curved corresponding section includes an opening.

12. The clamp according to claim 11, wherein:
    the curved corresponding section includes a second opening; and
    the opening and second opening are formed at opposite ends of the curved corresponding section.

13. The clamp according to claim 11, further comprising a back-up member positioned adjacent to and radially outward of the clamp body, the back-up member having an opening aligned with the opening of the curved corresponding section.

14. The clamp according to claim 7, wherein the curved corresponding section has a smaller width than that of the straight corresponding section.

15. The clamp according to claim 7, wherein the curved corresponding section has a thickness smaller than that of the straight corresponding section.

* * * * *